United States Patent [19]
Berneth et al.

[11] Patent Number: 5,092,925
[45] Date of Patent: Mar. 3, 1992

[54] MIXTURE OF 3,1-BENZOXAZINES AND FLUORANES

[75] Inventors: Horst Berneth, Leverkusen; Günter Klug, Monheim; Gert Jabs, Odenthal, all of Fed. Rep. of Germany

[73] Assignee: Bayer Aktiengesellschaft, Leverkusen, Fed. Rep. of Germany

[21] Appl. No.: 446,822

[22] Filed: Dec. 6, 1989

[30] Foreign Application Priority Data

Dec. 10, 1988 [DE] Fed. Rep. of Germany ....... 3841668

[51] Int. Cl.$^5$ ............................................. C09D 11/00
[52] U.S. Cl. ..................................... 106/21; 503/218; 503/221
[58] Field of Search ................... 106/19, 21; 427/151; 503/218, 221

[56] References Cited

U.S. PATENT DOCUMENTS

| | | | |
|---|---|---|---|
| 4,275,905 | 6/1981 | Miller | 503/209 |
| 4,299,411 | 11/1981 | Brockett | 503/214 |
| 4,831,141 | 5/1989 | Berneth et al. | 544/90 |

FOREIGN PATENT DOCUMENTS

| | | |
|---|---|---|
| 3225028 | 1/1983 | Fed. Rep. of Germany . |
| 3622262 | 1/1988 | Fed. Rep. of Germany . |
| 2445333 | 12/1979 | France . |
| 2105737 | 3/1983 | United Kingdom . |

*Primary Examiner*—William R. Dixon, Jr.
*Attorney, Agent, or Firm*—Sprung Horn Kramer & Woods

[57] ABSTRACT

The invention relates to mixtures of a) at least one 3,1-benzoxazine of the formula

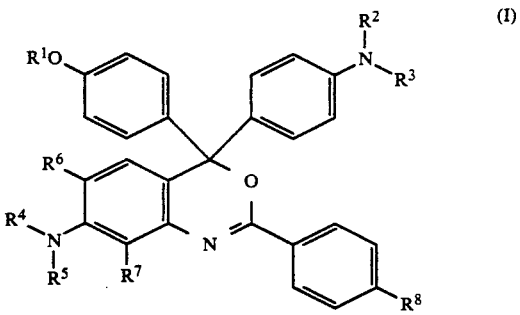

and b) at least one fluorane of the formula

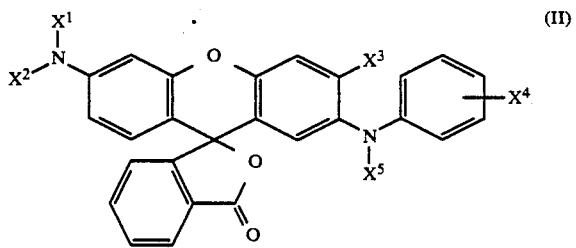

wherein the radicals of the abovementioned formulae have the meaning given in the description, and their use as color-forming agents for pressure- and heat-sensitive recording materials and to such recording materials.

7 Claims, No Drawings

MIXTURE OF 3,1-BENZOXAZINES AND FLUORANES

It is known that 3,1-benzoxazines (EP-A 187,329 and DE-A 3,622,262) or fluoranes (DE-A 2,024,859, 2,202,315 and 2,244,873) are suitable as color-forming agents for pressure-or heat-sensitive recording systems.

For both classes of substances there are suitable substitution patterns which allow development of a black color shade, although in some cases with a reddish, bluish or greenish hue.

However, the dyestuff developed, and also the microencapsulated color-forming agent which has not been developed, often do not show completely satisfactory light-fastnesses.

In the case of color-forming agents of the 3,1-benzoxazine type which develop to give a black color, exposure of the developed dyestuff, exposure of the copy, often results in a shift in hue into the greenish region, whereas exposure of the non-developed color-forming agent, exposure of the capsule, merely leads to a slight attenuation in the intensity of the copy which can then still be achieved.

In the case of color-forming agents of the fluorane type which develop to give a black color, exposure of the copy and of the capsule often result in a shift in hue into the reddish region with a slight to relatively marked drop in intensity.

It has now been found that mixtures of 3,1-benzoxazines and fluoranes have improved light-fastnesses and thus provide more intense copies in the exposed and —surprisingly— also in the non-exposed state than the components themselves.

The invention accordingly relates to a mixture of a) at least one 3,1-benzoxazine of the formula

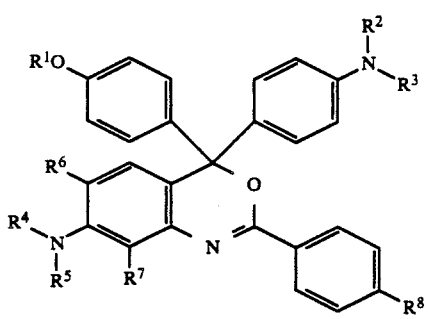

wherein $R^1$ to $R^5$ independently of one another denote optionally branched $C_1-C_4$-alkyl, one of the radicals $R^6$ or $R^7$ denotes methyl, ethyl, methoxy, ethoxy or chlorine and the other denotes hydrogen and $R^8$ denotes hydrogen, methyl or chlorine, and b) at least one fluorane of the formula

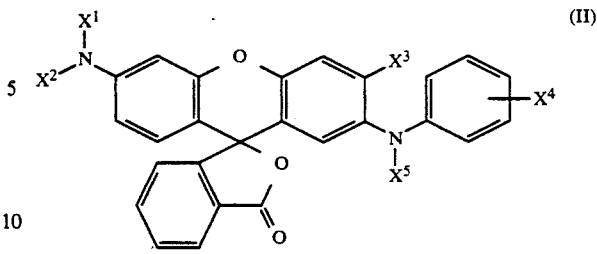

$X^1$ and $X^2$ and independently of one another denote hydrogen, optionally branched $C_1-C_8$-alkyl, which can be substituted by $C_1-C_3$-alkoxy, cyclohexyl, phenyl or heterocyclic radicals from the series comprising the optionally partly hydrogenated or hydrogenated furans, pyrroles and pyridines, allyl, cyclopentyl or cyclohexyl, or $NX^1X^2$ denotes pyrrolidino, piperidino or morpholino, $X^3$ denotes hydrogen, methyl, methoxy or chlorine, $X^4$ denotes hydrogen, methyl, trifluoromethyl, fluorine, chlorine, acetyl, cyano or anilino, which can be in the o-, m- or p-position, and $X^5$ denotes hydrogen, methyl, ethyl or benzyl, and their use as color-forming agents for pressure- and heat-sensitive recording materials and to such recording materials.

A mixture of 3,1-benzoxazines of the formula (I) wherein $R^1-R^5$ denote methyl or ethyl, one of the radicals $R^6$ or $R^7$ denotes methyl, methoxy or chlorine and the other denotes hydrogen and $R^8$ denotes hydrogen, methyl or chlorine, and fluoranes of the formula (II) wherein $X^1$ and $X^2$ denote hydrogen, methyl, ethyl, propyl, 2-propyl, butyl, 2-butyl, 2-methyl-1-propyl, pentyl, 2-pentyl, 3-pentyl, 2-methyl-1-butyl, 3-methyl-1-butyl, 2-ethyl-1-propyl, hexyl, 2-hexyl, 3-hexyl, 4-methyl-1-pentyl, 2-methoxy-ethyl, 2-ethoxy-ethyl, 3-methoxy-propyl, 3-ethoxy-propyl, 4-methoxy-butyl, 4-ethoxy-butyl-, cyclohexylmethyl, benzyl, furfuryl, pyrrolidin-2-yl-methyl, 2-(2- or 4-pyridyl)-ethyl, allyl, cyclopentyl or cyclohexyl, or $NX^1X_2$ denotes pyrrolidino, piperidino or morpholino, $X^3$ denotes hydrogen, methyl or chlorine, $X^4$ denotes hydrogen, methyl, fluorine, chlorine or anilino, which can be in the o-, m- or p-position, and $X^5$ denotes hydrogen or methyl, is preferred.

A mixture of 3.1-benzoxazines of the formula (I) wherein $R^1-R^5$ denote methyl or ethyl, one of the radicals $R^6$ or $R^7$ denotes methyl or chlorine and the other denotes hydrogen and $R^8$ denotes hydrogen or chlorine, and fluoranes of the formula (II) wherein $X^1$ and $X^2$ denote methyl, ethyl, propyl, 2-propyl, butyl, 2-methyl-1-propyl, furfuryl, 3-ethoxy-propyl or cyclohexyl, $X^3$ denotes hydrogen or methyl, $X^4$ denotes hydrogen, methyl, fluorine or chlorine which is in the o-position or anilino which is in the p-position and $X^5$ denotes hydrogen, is particularly preferred.

A mixture of 3,1-benzoxazine of the formula

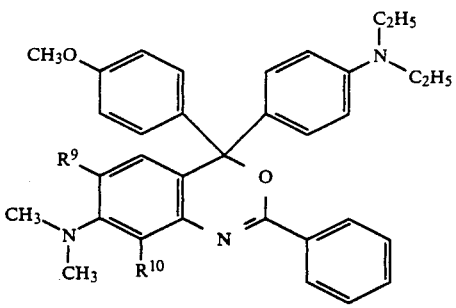
(III)

wherein
R⁹ denotes methyl and
R¹⁰ denotes hydrogen or
R⁹ denotes hydrogen and
R¹⁰ denotes methyl,
and fluoranes of the formula

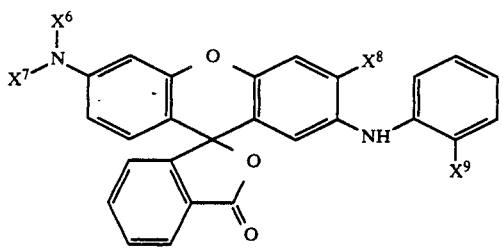
(IV)

wherein
X⁶ denotes methyl, ethyl, propyl or butyl,
X⁷ denotes methyl, ethyl, propyl, butyl, furfuryl or cyclohexyl,
X⁸ denotes hydrogen or methyl and
X⁹ denotes hydrogen or chlorine,
is especially preferred.

As a rule in each case one 3,1-benzoxazine and one fluorane are mixed in the mixtures. The mixing ratio is between 5/95 and 95/5, preferably between 20/80 and 80/20. Mixtures which contain the benzoxazine component in an amount of 50% or more are particularly preferred.

However, the benzoxazine and/or fluorane components can themselves also in each case be mixtures. Those mixtures inn which the benzoxazine component is a mixture of two benzoxazines which are isomers in respect of the radicals R⁶ and R⁷ or R⁹ and R¹⁰ are preferred, examples which may be mentioned being:

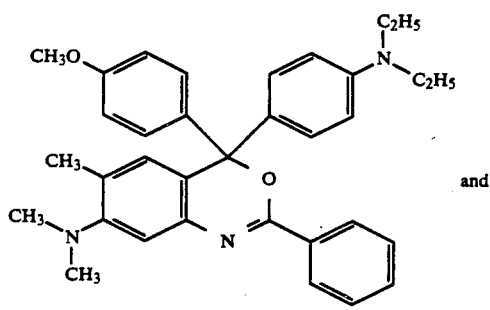
and

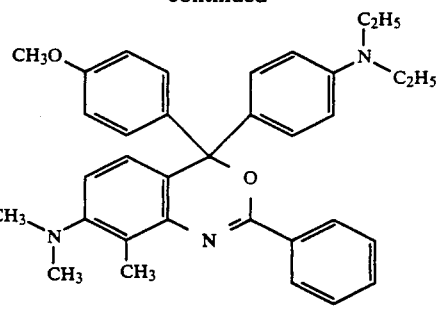

Such isomer mixtures can have a mixing ratio of 99/1 to 1/99, preferably 95/5 to 5/95 and particularly preferably 90/10 to 10/90.

The invention furthermore relates to the use of the mixtures of 3,1-benzoxazines of the formula (I) and fluoranes of the formula (II) as color-forming agents in pressure- or heat-sensitive recording materials.

The mixtures according to the invention exhibit a good color intensity both on phenolic substrates and, in particular, on activated clays. Their speed of development is almost independent of the substituents. In general, they are distinguished by a high speed of development coupled with a simultaneously reduced sensitivity of the recording materials towards unintentional premature development.

Their development colòr shade is reached immediately without undesirable changes in hue occurring during or after development.

A pressure-sensitive material consists, for example, of at least one pair of sheets which contain a color-forming agent mixture according to the invention, dissolved or dispersed in a non-volatile organic solvent, and a developer.

Such processes and formulations are known, for example, from U.S. Pat. No. 2,800,457, 2,800,458, 2,948,753, 3,096,189 and 3,193,404 and from DE-A 2,555,080 and 2,700,937.

In order to prevent premature activation of the color-forming agents present in the pressure-sensitive recording material, these are preferably enclosed in microcapsules which as a rule can be crushed under pressure.

Suitable capsule wall materials are, for example, gelatine/gum arabic, polyamides, polyurethanes, polyureas, polysulphonamides, polyesters, polycarbonates, polysulphonates, polyacrylates and phenol-, melamine- or urea-formaldehyde condensates, such as are described, for example, in M. Gutcho, Capsule Technology and Microencapsulation, Noyes Data Corporation 1972, G. Baster, Microencapsulation, Processes and Applications, publisher J.E. Vandegaar, and in DE-A 2,237,545 and 2,119,933.

Microcapsules with shells which consist of polyaddition products of polyisocyanates and polyamines are preferably used in the process according to the invention.

Isocyanates to be employed for the preparation of such microcapsules are diisocyanates, polyisocyanates, diisocyanates having a biuret structure, polyisocyanates modified by di- or trifunctional alcohols or other modified isocyanates, for example those of the formula:

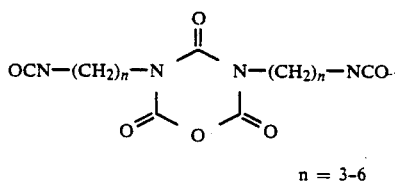

(VII)

n = 3-6

Diamines which are suitable for reaction with the isocyanates mentioned are aliphatic primary or secondary di- or polyamines Isocyanates, amines, solvents and a suitable preparation process for such microcapsules are described, for example, in DE-A 3,203,059.

Microcapsules with shells which consist of polyamides or melamine-formaldehyde condensates or gelatine/gum arabic are also preferably used.

Developers which may be mentioned are clays, acid-modified clays, oxides or acid salts and monomeric, resinous or polymeric phenols, carboxylic acids, salicylic acids or metal salts thereof.

Thermoreactive recording systems include, for example, heat-sensitive recording and copier materials . and papers.

Such a material is described, for example, in DE-A 2,555,080.

Suitable developers are the same electron acceptors such as are used in pressure-sensitive papers, preferably phenolic compounds, which are described, for example, in DE-A 1,251,348, as well as boric acid and organic, preferably aliphatic, dicarboxylic acids.

Another suitable thermoreactive development system, in which acid-modified polymers, preferably of acrylonitrile, act as the developer is described in DE-A 3,337,296.

Coated back papers which are coated with capsules and contain the mixtures, according to the invention, of the color-forming agents dissolved in an organic solvent are brought into contact in the customary manner with commercially available coated front papers coated with the abovementioned developers, or capsules which contain the mixtures, according to the invention, of the colourforming agents dissolved in an organic solvent are applied together with the abovementioned developers on the upper side of a sheet in the customary manner and used in the customary manner as "self-contained papers" in a carbon set. The copy is formed by image-wise mechanical pressure on the surface by development of the color-forming agent solution discharged from the destroyed capsules on the surface of the coated front or self-contained paper.

To measure the reflectance, a large-area copy, for example, is produced by pressure-induced destruction of the capsules, containing the color-forming agent mixture according to the invention, of a coated back paper onto the front side, containing the color developer, of a coated front paper, or a large-area copy is made by pressure-induced destruction of the capsules, containing the color-forming agent mixture according to the invention, mixed with the color developers on the front side of a self-contained paper.

The intensity of this copy can be determined with the customary optical spectrophotometers, such as, for example, an El Repho 44381 from Carl Zeiss. The intensity is then given by the size of the absorption value. This is calculated from the formula:

$$\% \text{ Abs.} = \frac{\% \text{ Ref.}_{CF} - \% \text{ Ref.}_{copy}}{\% \text{ Ref.}_{CF}} 100$$

wherein:

% Abs. = absorption value, corresponding to the intensity

% Ref.$_{CF}$ = reflectance of the coated front paper

% Ref.$_{copy}$ = reflectance of the copy

To determine the light-fastnesses, the copy (coated front fading) or the capsule-coated coated back or self-contained side (coated back decline) is irradiated with daylight lamps for 48 hours The intensity of the exposed copy (coated front fading) is determined as above and the color shade is compared with the original by visual inspection.

On exposure of the capsule-coated side of the coated back paper or the top side of a self-contained paper, a copy is then produced by exerting pressure. Its intensity (coated back decline) is determined as above and compared analogously, together with the color shade, with the copy of a non-exposed coated back or self-contained paper.

Black copies which have originated by development from the color-forming agent mixtures according to the invention show significantly higher intensities here, even with coated front fading and D (sic) back decline, and a smaller shift of the color shade than copies which have originated from color-forming agent solutions of the same concentration of the individual color-forming agent components.

Example A:

Preparation of a microcapsule dispersion 26 g of 3,5-bis-(6-isocyanato-hexyl)-2H-1,3,5-oxadiazine-2,4,6-(3H,5H)-trione are stirred into 174 g of a color donor solution containing, to the extent of 5%, individual color-forming agents or the color-forming agent mixture according to the invention in an isomer mixture of diisopropylnaphthalene. This mixture is emulsified with 251 g of a 0.5% strength polyvinyl acetate solution (Mowiol 26/88, Hoechst AG) on a rotorstator dispersing apparatus so that the average drop size of the emulsion is 7 μm. 49 g of a 9% strength diethylenetriamine solution are now added, while stirring, and the mixture is conditioned at 60° C for 2 hours A microcapsule dispersion is thus obtained, determination of the dry content of which results in a weight content of 39.8%.

EXAMPLE B:

Preparation of a coated back paper 2.1 g of Arbocell BE 600/30, 2.0 g of binder Baystal P 1700 and 16.3 g of water are stirred into 12.9 g of an approximately 40% strength capsule dispersion. This mixture is applied to a base paper (40 g/m$^2$) by means of a 40 μm doctor blade and dried. A coated back paper having a coating weight of about 5.5 g/m$^2$ is thus obtained.

EXAMPLE C

Production of a copy

The coated back papers prepared in Example B are brought together with a commercially available coated front paper, the receiver layer of which consists of activated clay (Reacto, Köhler), in the customary manner. The copy is formed here by 340 impressions of the letter w over an area of 4×4 cm² with the closest possible spacing using an electric typewriter from Olympia Werke AG, Wilhelmshaven, model Olympia SGED 52, with the lowest tapping intensity.

The intensity is calculated in accordance with the abovementioned formula from the reflectance of the 4th copy of a set in which sheets 1-3 consist of base paper (46 g/m²), sheet 4 consists of the coated back paper prepared in Example B and sheet 5 consists of the commercially available coated front paper.

EXAMPLE D

A copy produced according to Example C or a coated back paper prepared according to Example B is irradiated for 48 hours in a box using light emitted by four 18 W fluorescent tubes (Sylvania-Luxline ES, daylight de luxe).

The intensities and color shades of some selected color-forming agent mixtures according to the invention and their components as well as the intensities and color shifts in coated front fading and coated back decline are summarized below. Color-forming agents $A_x$:

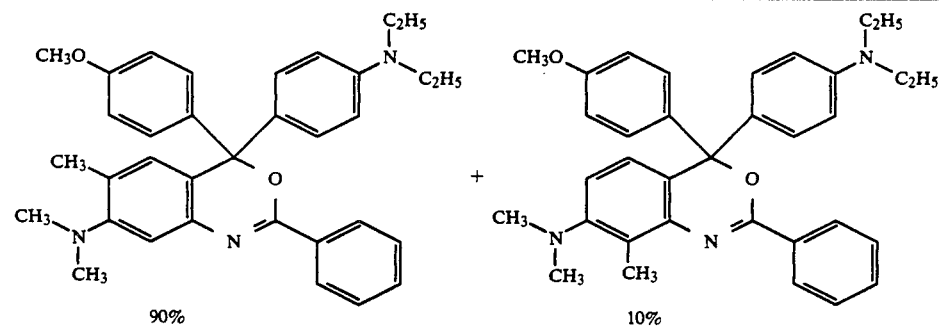

Isomer Mixture B

| Example | $A_x$ | $A_x$ % | B % | Solvent[a] | Copy Colour shade | Int. % | Coated front fading Colour shade | Int. % | Coated back decline Colour shade | Int. % |
|---|---|---|---|---|---|---|---|---|---|---|
| 1 | — | — | 100 | U | blue-black | 48 | green | 43.7 | grey-blue | 46.3 |
| 2 | — | — | 100 | X | blue-black | 50 | green | 45.3 | grey-blue | 41.5 |
| 3 | $A_1$ | 100 | — | X | brown-black | 40 | red | 39.3 | brown | 36.5 |
| 4 | $A_2$ | 100 | — | X | brown-black | 41 | red | 39.6 | brown | 29.6 |
| 5 | $A_3$ | 100 | — | U | grey | 38 | red | 35.6 | ochre | 6.7 |
| 6 | $A_4$ | 100 | — | U | brown-black | 39 | red-brown | 32.4 | ochre | 7.0 |
| 7 | $A_1$ | 67 | 33 | U | black | 53 | black-green | 52.0 | black | 47.5 |
| 8 | $A_1$ | 67 | 33 | X | black | 54 | black-green | 51.3 | black | 52.0 |
| 9 | $A_1$ | 50 | 50 | X | black | 51 | black-green | 49.9 | black-brown | 47.6 |
| 10 | $A_3$ | 50 | 50 | U | black | 50 | black-green | 42.0 | grey | 26.0 |
| 11 | $A_4$ | 50 | 50 | U | black | 51 | black-green | 33.8 | black-brown | 26.9 |
| 12 | $A_2$ | 67 | 33 | X | black | 52 | black-green | 47.2 | black | 45.3 |

[a]U: isomer mixture of diisopropylnaphthalene X: chloroparaffin/dodecylbenzene

Other suitable mixtures are:

EXAMPLE 13

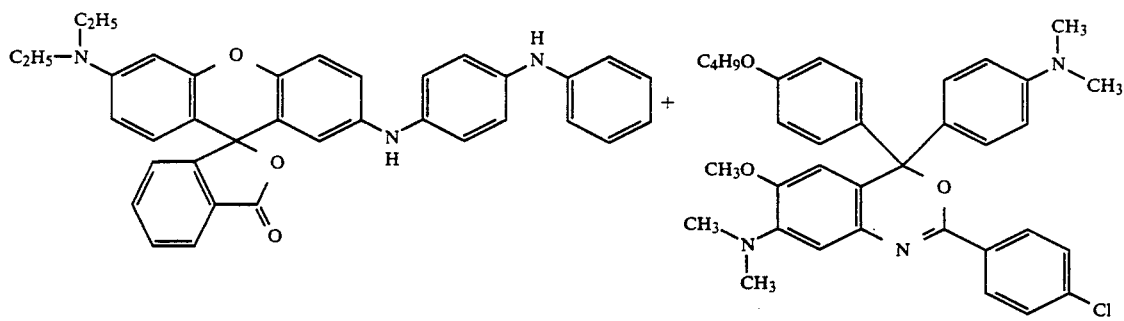
EXAMPLE 14
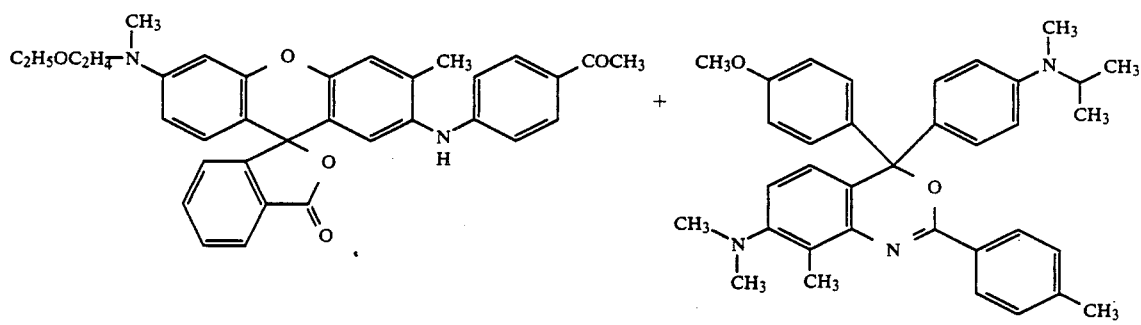
EXAMPLE 15
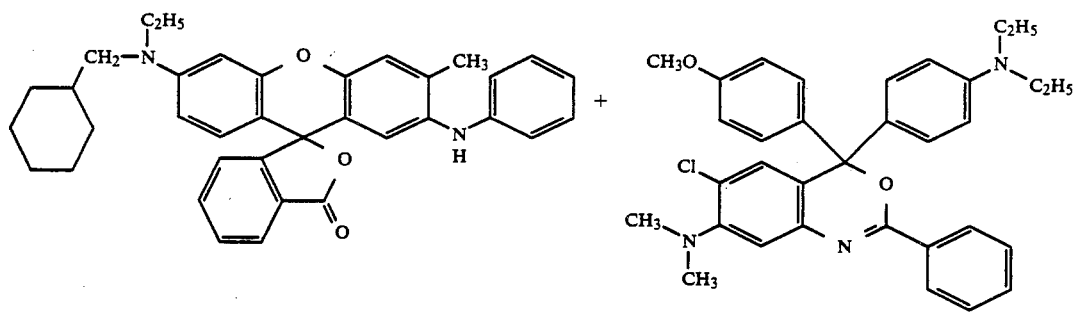
EXAMPLE 16
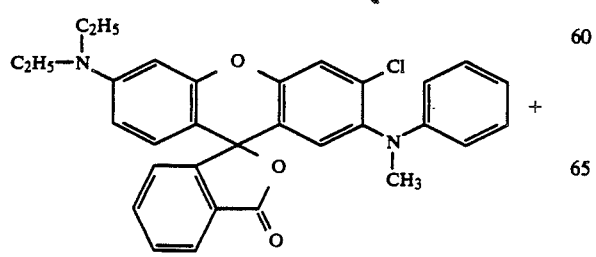
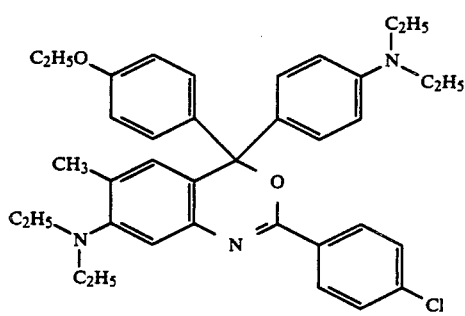
EXAMPLE 17

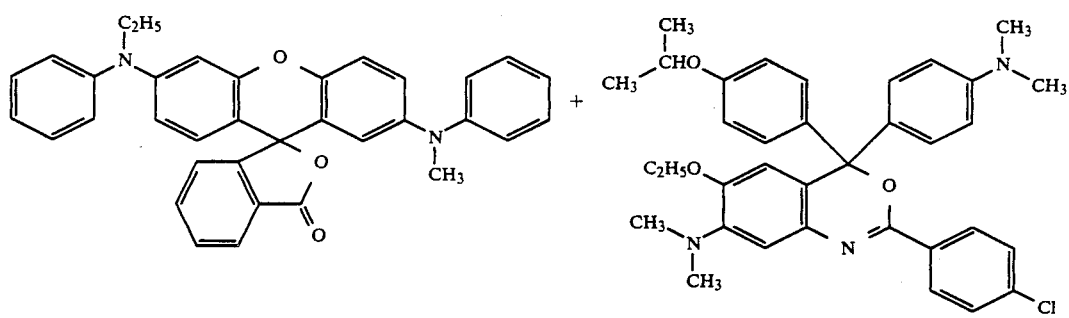
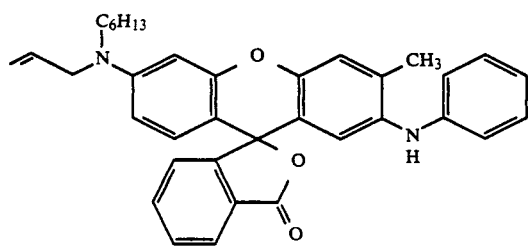
EXAMPLE 18
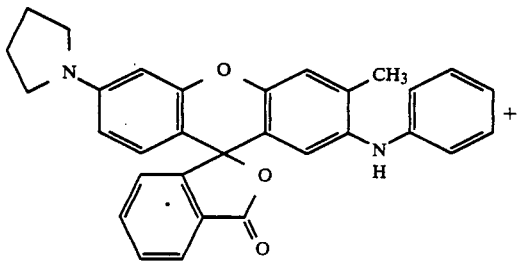
EXAMPLE 20
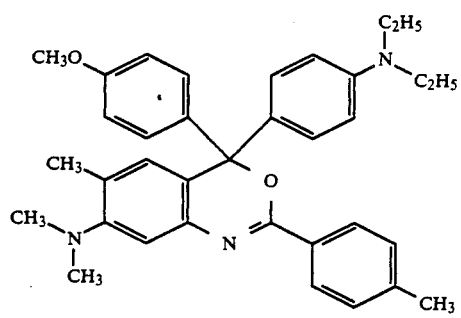
EXAMPLE 19
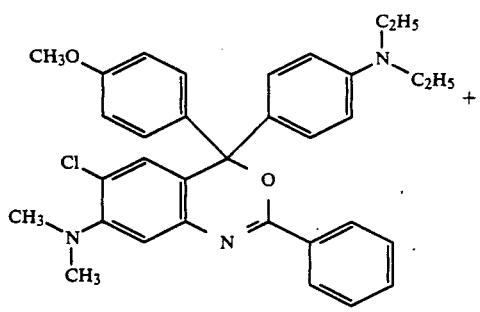
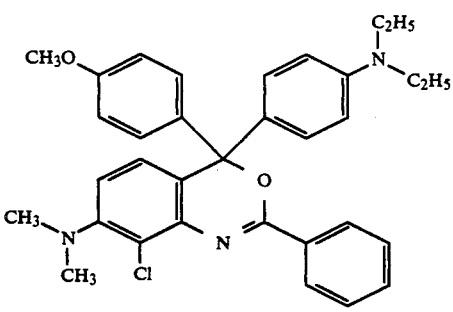
We claim:
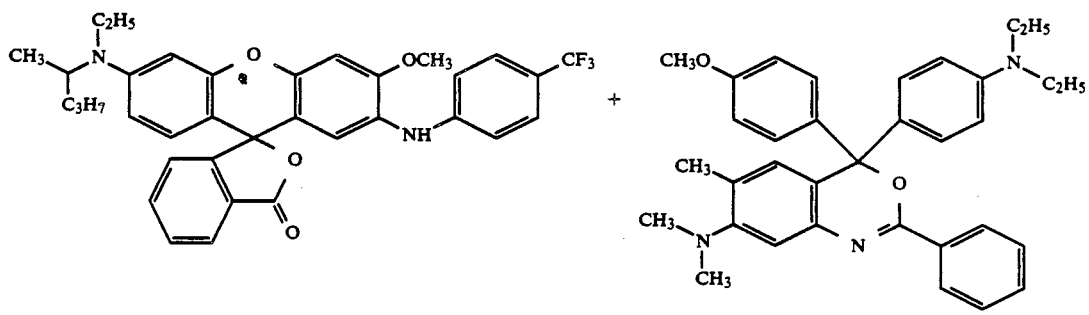

1. Mixtures of a) at least one 3,1benzoxazine of the formula

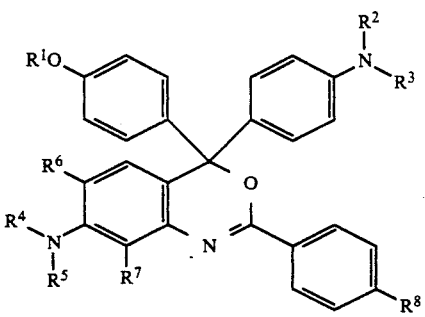

wherein
$R^1$ to $R^5$ independently of one another denote optionally branched $C_1-C_4$-alkyl,
one of the radicals $R^6$ or $R^7$ denotes methyl, ethyl, methoxy, ethoxy or chlorine and the other denotes hydrogen and
$R^8$ denotes hydrogen, methyl or chlorine, and b) at least one fluorane of the formula

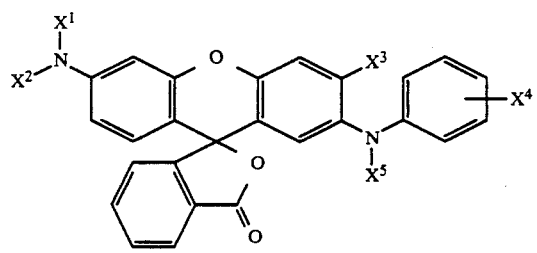

wherein
$X^1$ and $X^2$ independently of one another denote hydrogen, optionally branched $C_1-C_8$-alkyl, which $C_1-C_8$-alkyl can be substituted by $C_1-C_3$-alkoxy, cyclohexyl, phenyl or heterocyclic radicals from the series comprising the optionally partly hydrogenated or hydrogenated furans, pyrroles, and pyridines,
$X^1$ and $X^2$ independently of one another also denote allyl, cyclopentyl or cyclohexyl, or
$NX^1X^2$ denotes pyrrolidin, piperidino or morpholino,
$X^3$ denotes hydrogen methyl, methoxy or chlorine,
$X^4$ denotes hydrogen, methyl, trifluoromethyl, fluorine, chlorine, acetyl, cyano or anilino, which can be in the o-, m- or p-position, and
$X^5$ denotes hydrogen, methyl, ethyl or benzyl,
and wherein the mixture ratio is between 5/95 and 95/5.

2. Mixtures according to claim 1, characterized in that in the formula given for the 3,1-benzoxazines,
$R^1-R^5$ denote methyl or ethyl,
one of the radicals $R^6$ or $R^7$ denotes methyl, methoxy or chlorine and the other denotes hydrogen and
$R^8$ denotes hydrogen, methyl or chlorine, and in the formula given for the fluoranes,
$X^1$ and $X^2$ denote hydrogen, methyl, ethyl, propyl, 2-propyl, butyl, 2-butyl, 2-methyl-1-propyl, pentyl, 2-pentyl, 3-pentyl, 2-methyl-1-butyl, 3-methyl-1-butyl, 2-ethyl, 1-propyl, hexyl, 2-hexyl, 3-hexyl, 4-methyl-1-pentyl, 2-methoxyethyl, 2-ethoxyethyl, 3-methoxypropyl, 3-ethoxy-propyl, 4-methoxy-butyl, 4-ethoxy-butyl, cyclohexylmethyl, benzyl, furfuryl, pyrrolidin-2-yl-methyl, 2-(2- or 4-pyridyl)-ethyl, allyl, cyclopentyl or cyclohexyl, or
$NX^1X^2$ denotes pyrrolidino, piperidino or morpholino,
$X^3$ denotes hydrogen, methyl or chlorine,
$X^4$ denotes hydrogen, methyl, fluorine, chlorine or anilino, which can be in the o-, m- or p-position, and
$X^5$ denotes hydrogen or methyl.

3. Mixtures according to claim 1, characterized in that in the formula given for the 3,1-benzoxazines,
$R^1-R^5$ denote methyl or ethyl,
one of the radicals $R^6$ or $R^7$ denotes methyl or chlorine and the other denotes hydrogen and
$R^8$ denotes hydrogen or chlorine, and in the formula given for the fluoranes $X^1$ and $X^2$ denotes methyl, ethyl, propyl, 2-propyl, butyl, 2-methyl-1-propyl, furfuryl, 3-ethoxy-propyl or cyclohexyl,
$X_3$ denotes hydrogen or methyl,
$X^4$ denotes hydrogen, methyl, fluorine or chlorine which is in the o-position or anilino which is in the p-position and
$X^5$ denotes hydrogen.

4. Mixtures according to claim 1, characterized in that the 3,1-benzoxazines correspond to the formula

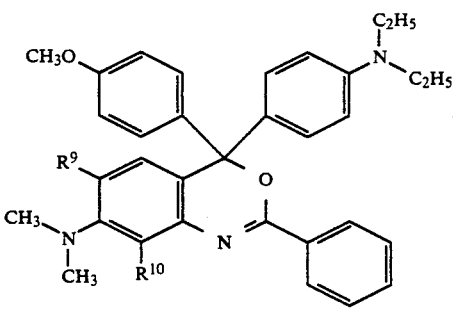

wherein
$R^9$ denotes methyl and
$R^{10}$ denotes hydrogen or
$R^9$ denotes hydrogen and
$R^{10}$ denotes methyl,
and the fluoranes correspond too the formula

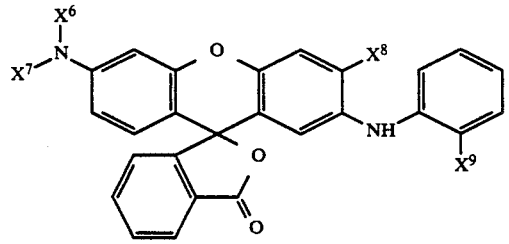

wherein
$X^6$ denotes methyl, ethyl, propyl or butyl,
$X^7$ denotes methyl, ethyl, propyl, butyl, furfuryl or cyclohexyl,
$X^8$ denotes hydrogen or methyl and
$X^9$ denotes hydrogen or chlorine.

5. Mixtures according to claim 1 or 2 or 3 or 4, characterized in that the benzoxazine component itself is a mixture, the components of which in turn differ in respect of the substituents $R^6/R^7$.

6. Mixtures according to claim 1 to 4, wherein the mixing ratio is between 20/80 and 80/20.

7. Mixtures according to claim 1, which contain 3,1-benzoxazine in an amount of 50% or more.

* * * * *